(No Model.)
H. E. NIESE & G. DINKEL.
APPARATUS FOR COOLING SUGAR.
No. 296,041. Patented Apr. 1, 1884.
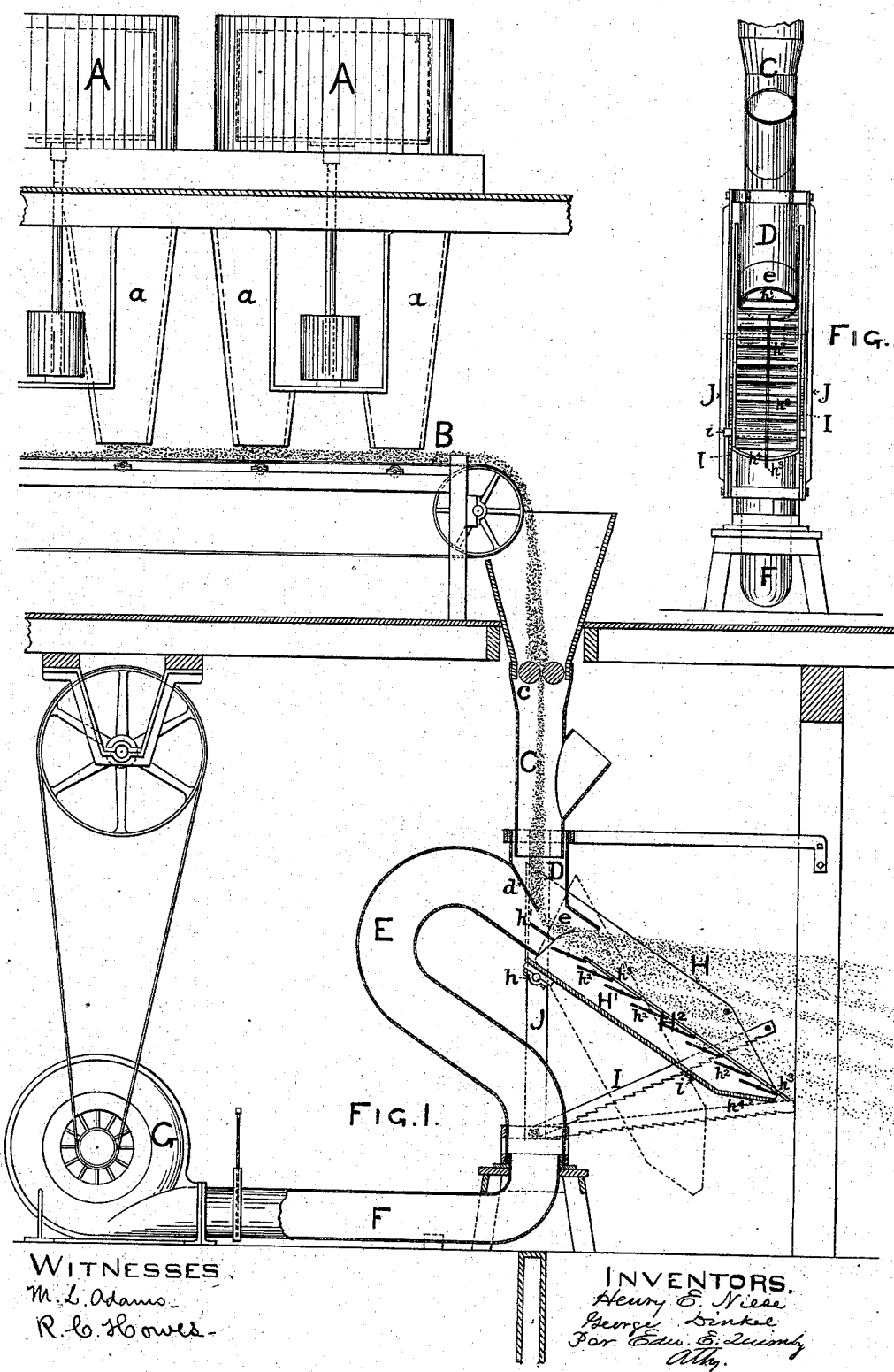
WITNESSES.
M. L. Adams
R. C. Howes
INVENTORS.
Henry E. Niese
George Dinkel
Per Edw. E. ?
Atty.

UNITED STATES PATENT OFFICE.

HENRY E. NIESE AND GEORGE DINKEL, OF JERSEY CITY, NEW JERSEY, ASSIGNORS TO THE F. O. MATTHIESSEN & WIECHERS SUGAR REFINING COMPANY, OF SAME PLACE.

APPARATUS FOR COOLING SUGAR.

SPECIFICATION forming part of Letters Patent No. 296,041, dated April 1, 1884.

Application filed May 28, 1883. (No model.)

*To all whom it may concern:*

Be it known that we, HENRY E. NIESE and GEORGE DINKEL, of Jersey City, New Jersey, have invented a certain Improvement in Apparatus for Cooling Sugar, of which the following is a specification.

Our invention relates to a modification of the apparatus for cooling soft sugar which we have described in another pending application, which we have entitled "Case A;" and it consists in suitable apparatus for collecting the sugar from the centrifugal machines in which it is drained, and conducting it to a pipe, down which the sugar falls upon a universally-adjustable chute, having a perforated false bottom covering a chamber into which air is forced at high pressure.

The features distinguishing our present apparatus from that described in our pending Case A, are, first, the arrangement of our cooling devices upon a lower level than that occupied by the centrifugal machines, so that no elevator is required for elevating the sugar after it leaves the centrifugals; and, secondly, the provision of a horizontal axis of oscillation for the chute, by which it is made universally adjustable, instead of being adjustable upon a vertical axis only, as in the structure shown in Case A; thirdly, the perforated false bottom of the chute and a compressed-air chamber beneath the perforated bottom, by means of which the sugar falling upon the perforated bottom of the chute is blown out therefrom and effectually scattered and cooled by a multiplicity of jets of air.

The accompanying drawings, representing an arrangement of apparatus embodying our invention, are as follows:

Figure 1 represents a vertical section of a portion of a refinery, showing centrifugal machines upon the higher floor, and a carrier-belt for carrying forward the sugar discharged from the centrifugal machines in a horizontal direction, and discharging it into the upper end of a pipe, through which it falls to the next lower floor, where the cooling and scattering apparatus is situated, the latter being represented in central vertical section with the chute directed laterally to the right. Fig. 2 is an elevation of the cooling and scattering apparatus, representing the chute as directed toward the observer.

In operation, sugar from the centrifugal machines A is discharged through the chutes $a$ upon the horizontal carrier-belt B, by which it is carried forward and dropped into the upper end of the vertical pipe C, through which it falls by its own gravity into the vertical branch D of the swiveling goose-neck pipe E. The lower end of the branch pipe D is provided with the inclined deflector $d$, by which the sugar is deflected into the upper part of the inclined nozzle $e$ of the goose-neck pipe E. The lower end of the goose-neck pipe E loosely surrounds the upper end of the air-blast pipe F, leading from the blower G. The goose-neck pipe E and the branch pipe D are, as will be seen, capable of rotation upon a vertical axis. There is attached to the nozzle of the goose-neck pipe the chute H. This attachment is effected by the hinged joint $h$, by which means the chute is given the capacity of oscillation upon a horizontal axis, in addition to the capacity of rotation upon a vertical axis which it derives by virtue of its connection with the goose-neck. In Fig. 1 the chute is represented in solid lines in one position of inclination and in dotted lines in another position of inclination.

To hold the chute at the elevation at which it may be arranged, I provide the ratchet-toothed rack I, pivoted at its lower end to the vertical bar J, which is affixed to the branch pipe D and to the lower end of the goose-neck E. The dog $i$, affixed to the side of the chute, is adapted to engage the ratchet-teeth of the rack I and sustain the chute H in the position to which it may be elevated. The air-blast from the nozzle of the goose-neck pipe E is, it will be seen, directed downward, one portion of it over and one portion of it under the false bottom $H^2$ of the chute H. The false bottom $H^2$ is composed of the fixed transverse slat $h'$ and the adjustable slats $h^2$, which latter are pivoted at the ends, and linked to the adjusting bar $h^3$, like the slats of a Venetian blind.

The air directed into the air-chamber H', beneath the false bottom H², escapes through the spaces between the slats $h^2$ and the space between the lowest slat and the upper edge of the transverse wall $h^4$, at the lower end of the chute. The chute is arranged over the bins and above the floor in or upon which the sugar is to be distributed, and, as will be seen, is capable of movement either upon a vertical or upon a horizontal axis.

In operation, the sugar, after being drained, is conducted by the belt to the upper end of the pipe C, and, if desired, there may be arranged within the pipe C the usual crushing-rollers, $c$, for crushing any lumps which may be present. It will be seen that the sugar, while falling under the influence of its own gravity, is struck by the jets of cold air supplied through the goose-neck E, and is violently scattered and thrown about in directions which are determined by the position of the chute. This produces upon the sugar not only a cooling effect, but, if the sugar is moist, a drying effect also, as the large quantity of air with which the sugar is thus brought into contact rapidly takes up any moisture with which the sugar may be charged.

We claim as our invention—

1. In apparatus for cooling soft sugar, substantially of the character described, a universal distributing-chute, H, in combination with a pipe or conveyer for conducting sugar into the upper end of the chute, and means for directing a downwardly-inclined blast of air into the upper end of the chute, substantially as and for the purposes set forth.

2. The chute H, provided with a perforated false bottom, H², in combination with the nozzle of an air-blast pipe, so arranged as to discharge a stream of air in a downward direction from the top both over and under the false bottom of the chute, and a conveyer or pipe for conveying or conducting sugar into the upper end of the chute, as and for the purposes set forth.

HENRY E. NIESE.
GEORGE DINKEL.

Witnesses:
LUTHER S. ELMER,
WILLIAM S. BAKER.